United States Patent [19]

Cakmak et al.

[11] Patent Number: 4,998,663
[45] Date of Patent: Mar. 12, 1991

[54] FRICTION WELDING APPARATUS

[75] Inventors: Mukerrem Cakmak; Kenneth Keuchel, both of Monroe Falls, Ohio

[73] Assignee: Edison Polymer Innovation Corporation, Cleveland, Ohio

[21] Appl. No.: 455,520

[22] Filed: Dec. 22, 1989

[51] Int. Cl.[5] ............................................. B23K 20/12
[52] U.S. Cl. ........................................ 228/2; 228/9; 228/103; 228/114; 425/108; 156/378
[58] Field of Search .................. 228/2, 44.3, 44.5, 9, 228/103, 112–114; 425/108, DIG. 22; 156/73.5, 378, 358, 360

[56] References Cited

U.S. PATENT DOCUMENTS

| | | |
|---|---|---|
| 3,545,071 | 12/1970 | Loyd et al. . |
| 3,635,388 | 1/1972 | Jenkinson et al. . |
| 3,717,295 | 2/1973 | Woodall et al. . |
| 3,888,405 | 6/1975 | Jones et al. . |
| 3,934,780 | 1/1976 | Flax ........................................ 228/2 |
| 3,954,215 | 5/1976 | Takagi et al. . |
| 4,514,242 | 4/1985 | MacLaughlin et al. . |
| 4,534,751 | 8/1985 | Fortuna et al. . |
| 4,552,609 | 11/1985 | Larsen . |
| 4,552,612 | 11/1985 | Fortuna et al. . |
| 4,741,788 | 5/1988 | Clark et al. . |
| 4,784,709 | 11/1988 | Unger et al. . |
| 4,787,956 | 11/1988 | Hoefer et al. . |

FOREIGN PATENT DOCUMENTS 1098722 6/1984 U.S.S.R. .................. 228/2

OTHER PUBLICATIONS

"Friction Welding of Plastics", R. J. Crawford, Y. Tam *Journal of Materials Science* 16 (1981) pp. 3275-3282.
"Static and Kinetic Coefficients of Friction of Plastic Film and Sheeting", ASTM Designation: D 1894 (1986).
"Kinetic Coefficient of Friction of Plastic Solids and Sheeting", ASTM Designation: D 3028 (1983).

*Primary Examiner*—Sam Heinrich
*Attroney, Agent, or Firm*—D. Peter Hochberg; Mark Kusner; Louis J. Weisz.

[57] ABSTRACT

A friction welding apparatus for preparing weldments by fictional contact of the weld members which includes sensors for measuring torque, axial forces, and other variables important to the control of the welding process, and for facilitating the obtainment of process information useful in correlating process conditions with weld quality. The apparatus includes means for the substantially frictionless coupling of the component providing the axial normal force on the aligned shafts upon which the weld pieces are mounted. The coupling, which contributes to accurate torque measurements, comprises a substantially frictionless, single-contact-point coupling provided by the point of contact between two adjacent spherical surfaces. The welding apparatus is also provided with a vacuum-braked air drive assembly for substantially instantaneously stopping relative rotation between the weld members after fusion of the members has occurred, thereby preventing undesirable over-run and resulting stress formation in the weld zone.

13 Claims, 1 Drawing Sheet

FRICTION WELDING APPARATUS

TECHNICAL FIELD

This invention relates to an apparatus for fabricating weldments by frictional heat. More particularly, this invention relates to a friction welding apparatus that provides a means for welding members together by heat-induced friction, one that is also useful for gathering welding data to enable the replication of optimal welds, and that permits similar welds to be produced with different friction welding apparatus. Specifically, this invention relates to friction welding apparatus that permits normal forces to be applied during the welding process to contacting weld members in the absence of substantial friction, thereby allowing accurate torque measurements to be carried out, and that permits the substantially instantaneous arrest of the relative rotational motion of the weld members after fusion of the weld interface surfaces has been accomplished.

BACKGROUND OF THE INVENTION

Friction welding has been employed for many years to weld heat-fusible weld members together. The process involves bringing the members to be welded together under pressure, and thereafter spinning one of them rapidly enough so that sufficient frictional heat is generated to cause fusing or melting of the weld members at their interface. Rotation is thereupon stopped, and the melted material at the interface is allowed to solidify, thereby providing a high-quality welded joint.

The process has distinct advantages over other welding processes. For instance, friction welding can be used to join materials that are adversely susceptible to oxidation, since the contacting surfaces effectively seal the fused area from contact with surrounding air. Furthermore, heat is present only in the immediate area of the joined surfaces, thus tending to eliminate possible adverse heat effects in adjacent areas of the members. The friction processes can also be employed to weld materials submerged in liquids, or to seal vessels containing liquids. Particularly in the case of plastics, because of their poor heat conductivity, frictionally created heat increases the temperature in the weld zone swiftly, making rapid welding and high production rates possible. An additional advantage of the process includes the fact that no hazardous solvents or adhesives are required to join the members together. Furthermore, friction welding equipment is reasonably inexpensive, and capable of volume production. It is also relatively uncomplicated, lending itself to piecework welding, even with ordinary shop machinery.

While friction welding processes offer many advantages, they suffer from the fact that measurement of the variables affecting the quality of the welds produced is difficult. In the absence of such data, fundamental welding information necessary to obtain an understanding of the process variables, and their interrelationship, is difficult if not impossible to obtain. Furthermore, without such information, process variables cannot be controlled during welding so as to achieve optimal welds, nor can welding techniques be easily transferred from one type of equipment to another. Also without such information, it is difficult to extrapolate conclusions based on experience with one material, to the welding of different materials.

In regard to the measurement of process variables, the coefficient of friction of the materials being welded has an important bearing on the amount of heat generated during rotation of the weld members; therefore, its determination under actual dynamic welding conditions is of particular interest. In order to measure dynamic friction, however, it is necessary to accurately measure the torque applied at the interface of the members being welded, simultaneously with the application of the normal forces urging the members together. Unfortunately, in ordinary friction welding apparatus the necessary connection between the force-generating component of the apparatus and the weld members being joined entails substantial frictional contact that interferes with accurate torque measurements, and therefore, with the accurate determination of dynamic coefficients of friction.

In addition, inertial forces of the drive assemblies of other friction welding apparatus tend to result in "overrun" rotation of the rotating weld members attached to the assemblies, causing the generation of shearing forces in the weld zone during solidification of the molten material. Such forces tend to create poor quality welds as a consequence of the highly stressed welds resulting therefrom.

Furthermore, the value of frictional coefficients depends upon the constantly changing temperature of the welding surfaces during their frictional engagement. This fact makes it difficult to determine coefficients by alternative test methods under substantially adiabatic conditions similar to those encountered during friction welding. Thus while other tests to determine frictional coefficients are known, they are commonly unable to provide proper temperature correlation.

ASTM test procedure D1894, for example, involves frictional measurements at the surface interface between a "test sled", and a moving plane. As the plane moves past the sled, however, the face of the sled is constantly being cooled, due to its contact with the ever-changing surface of the moving plane which is at the ambient temperature. This prevents valid friction measurements under dynamic temperature conditions.

An alternative test procedure entails a rotating disk in association with a rod or cylinder that contacts the disk at an interface with a measured force. Like the prior procedure described, however, the point of contact constantly encounters fresh surfaces at the ambient temperature of the apparatus, thus preventing accurate substantially adiabatic friction measurements.

In view of the preceding, therefore, it is a first object of this invention to provide an improved friction welding apparatus.

A second object of the invention is to provide a friction welding apparatus that allows process variables to be continuously monitored during the welding procedure.

An additional aspect of this invention is to furnish a friction welding apparatus that provides means for imposing normal forces on the members to be welded through a substantially frictionless coupling.

Another aspect of this invention is to provide accurate torque measurements throughout the friction welding procedure.

A further object of this invention is to provide a friction welding apparatus that permits the measurement of dynamic coefficients of friction.

Yet an additional aspect of this invention is to make available a friction welding apparatus that can be stopped substantially instantaneously at a desired moment in the welding process.

Still another aspect of this invention is to provide a frictionless welding apparatus that facilitates measurement of friction coefficients under substantially adiabatic heating conditions.

Yet a further aspect of this invention is to allow the gathering of sufficient friction welding data to carry out computer simulation, and to generate desirable process control parameters to guide the operation of other, different friction welding apparatus.

BRIEF DESCRIPTION OF THE INVENTION

The foregoing and additional aspects of the invention are provided by a friction welding apparatus comprising: a first, substantially non-rotating shaft axially aligned with a second, rotating shaft; means for mounting the members to be welded together to adjacent, mounting ends of each of the shafts; means for applying a measured force axial to the shaft; single-contact-point coupling means for coupling the force-applying means to the non-mounting end of the first shaft; means for rotating the second shaft; and means for measuring torque applied to the first shaft, wherein the first shaft can be axially moved by said force-applying means to force the members together, and the second shaft can be rotated by the rotating means to cause the generation of frictional heat at the contacting surfaces of the members sufficient to fuse the surfaces together.

The foregoing and other aspects of the invention are provided by a friction welding apparatus comprising: a first substantially non-rotating shaft axially aligned with a second rotating shaft; means for mounting the members to be welded together to adjacent, mounting ends of each of the shafts; means for applying a measured force axial to the shafts; a single-contact-point coupling means between the force-applying means and the non-mounting end of the first shaft, the coupling means being defined by the point of contact between two adjacent spherical surfaces; a motor drive assembly for rotating the second shaft; means for measuring the amount of burn-off during the welding of the members mounted in the apparatus; and means for measuring torque applied to the first shaft, wherein the first shaft can be axially moved by the force-applying means to force the members into contact with each other, and the second shaft can be rotated by the rotating means to cause the generation of frictional heat at the contacting surfaces of the members sufficient to fuse the surfaces together.

The foregoing and further aspects of the invention are provided by weldments prepared with the apparatus of the penultimate paragraph.

BRIEF DESCRIPTION OF THE DRAWINGS

The invention will be better understood when reference is had to the following drawings, in which like-numbers refer to like-parts, and in which.

DETAILED DESCRIPTION OF THE INVENTION

Figure 1:
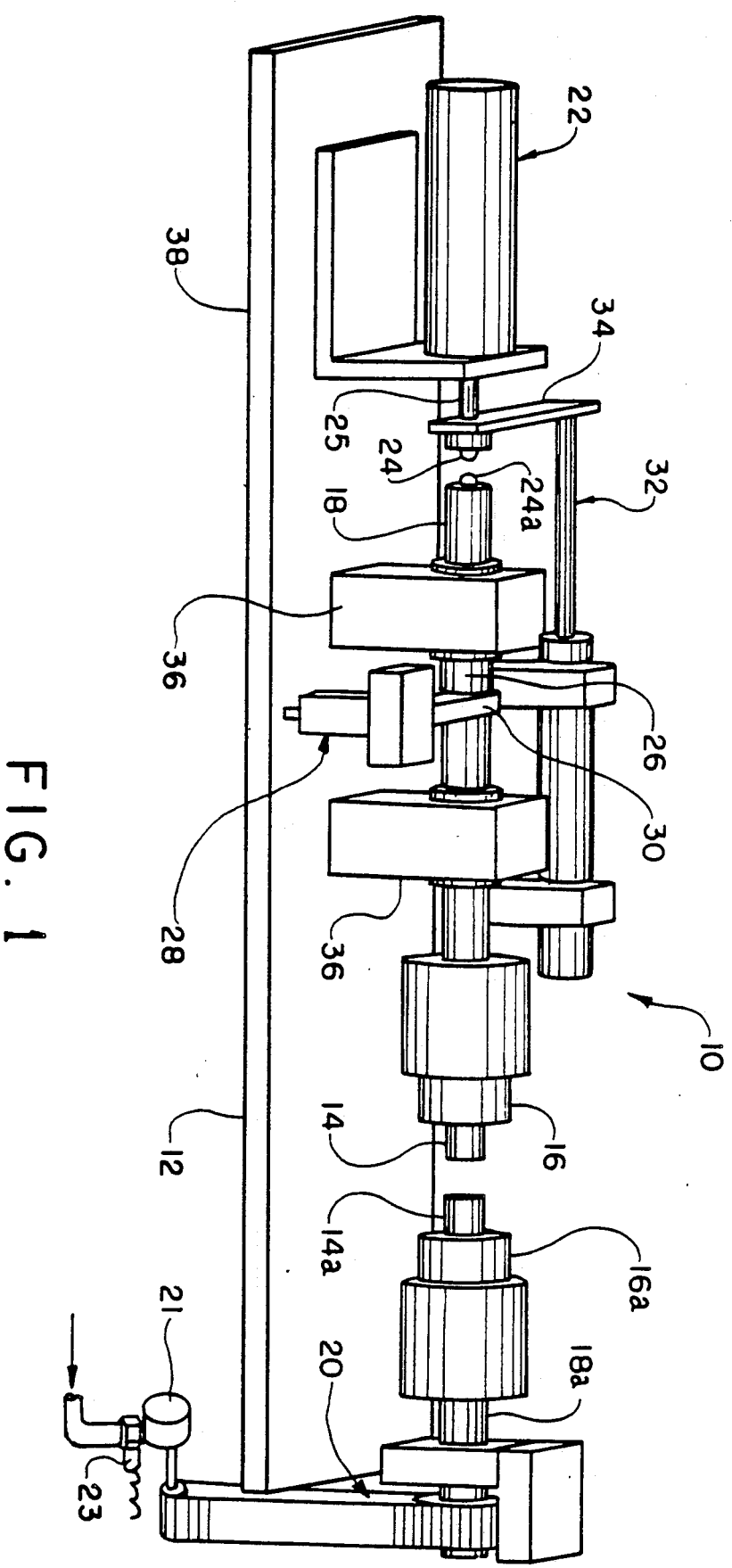
FIG. 1 is an isometric view of a friction welding apparatus of the invention.

FIG. 1 is an isometric view of a friction welding apparatus of the invention 10. As shown, the apparatus comprises a substantially non-rotating shaft 18, one end of which is provided with a weld member-holding chuck 16 in which is mounted one of the weld members to be welded 14. The other, non-mounting, end of shaft 18 is provided with a hemispherical contact member 24a. Shaft 18 also contains an axial force transducer 26 for measuring the amount of axial force imposed upon the shaft, and a torque arm 30 that transmits the torque force to which shaft 18 is subjected to a torque-measuring transducer assembly 28. The shaft is mounted on two frictionless linear bearing supports 36 that allow both rotational and longitudinal movement of the shaft therethrough, with minimal friction.

Also associated with the apparatus 10 is a rotatable shaft 18a which comprises on one end thereof a weld member-holding chuck 16a for mounting another weld member 14a therein; while on the other end, an air motor drive assembly, generally 20, is provided for the purpose of rotating shaft 18a. The air motor drive assembly 20 includes an air motor 21, whose air intake has a solenoid valve 23 located therein, the latter controlling the air available to the motor.

At the end of the apparatus 10, opposite to the drive end, is located an air cylinder, generally 22, which moves the other one of the hemispherical contact members 24 of the two making up the single-contact-point frictionless coupling of the apparatus. Also attached to the air cylinder 22 is a connecting arm 34 that is connected to a linear variable differential transducer, generally 32, which measures the travel of air cylinder shaft 25 on which member 24 is mounted.

The friction welding apparatus of the Figure is useful both for welding members such as 14 and 14a together under predetermined conditions that, if desired, can be controlled by a computer. In addition, due to its extensive instrumentation, as described, the welding apparatus is useful for collecting data defining the friction welding process, thus permitting the correlation of such data with the welds resulting from the welding operations during which the data was acquired. The empirical relationship thus established allows conclusions to be drawn relative to optimal weld conditions, and permits the translation of such conditions to different welding apparatus.

The apparatus of the Figure is useful both in welding, and for gathering weld data with respect to a variety of plastics, filled and unfilled, such as for example, polyethylene, polypropylene, polystyrene, poly(methyl methacrylate), polyvinyl chloride, and others. The apparatus is also useful for the friction welding of metal objects, and it can be employed to weld metals to plastics, plastics to plastics, metals to metals, as well as joining other materials, similar and dissimilar.

In performing the welding procedure, the weld members to be joined, such as 14 and 14a, are mounted in holding means, for instance, chucks 16 and 16a. The air motor drive assembly 20 is then activated, and the shaft 18a is rotated until it reaches the desired rotational velocity. At that point, an axial normal force is applied by a force-generating means, for example, air cylinder 22, causing the spherical surface portions of the hemispherical contact members 24 and 24a of the single-contact-point frictionless coupling to engage each other. Due to the single point contact of the spherical surfaces, it is possible to transmit an axial force from the air cylinder 22 to the shaft 18 with substantially no friction. The shaft 18 is thereupon axially moved toward the air motor drive assembly end of the apparatus until the weld members 14 and 14a are brought into frictional contact. Despite the rotation of shaft 18a, however, shaft 18 remains substantially non-rotating as a result of the torque arm 30 and its attached torque transducer assembly 28, which prevents movement of the shaft due to the latter's contact with support table 38. Since the shaft 18 is mounted in frictionless linear bearings 36, and since the axial force is transmitted through a frictionless coupling, all of the torque created by the contact of the weld members with each other is transmitted through the torque transducer assembly 28. The substantial elimination of torque created by frictional drag in the components of the apparatus other than that in the contacting weld members, permits highly accurate torque measurements to be obtained.

An alternative method for measuring torque involves the use of a thin film strain gauge of the type manufactured by the Measurements Group company of Raleigh, N.C. The device consists of a thin piece of flexible film possessing properties that allows the measurement of strain on the torqued shaft that is adhesively fastened about a portion of the circumference of the stationary shaft 18, at a point located between the weld member 14 and a lever arm similar to 30 that prevents rotation of the shaft. Twist in the shaft proportional to the imposed torque causes distortion of the film, resulting in the production of an electric signal that can be compared to a known calibration.

Weld time will depend upon the dimensions of the pieces being welded and the compositions of the weld materials. Weld times are relatively short, however, frequently ranging from no more than about 0.2 to about 7 seconds.

As the rotating weld member 14a bears against the substantially non-rotating weld member 14, intense frictional heat is generated, causing the surface interface of the members to reach a temperature sufficient to cause surface fusion. The shortening of the weld members 14 and 14a resulting from such fusion, termed "burn-off", results in further movement of the air cylinder shaft 25, producing a corresponding effect in the linear variable differential transducer. This permits valid conclusions to be drawn regarding the amount of material fused, and allows the weldment produced to be controlled within whatever overall weldment length specifications are required.

The amount of burn-off experienced will depend upon the specifications set for the weldment being prepared and is proportional to the amount of "flash" generated during welding, i.e., the amount of weld material forced from between the contacting surfaces, but will normally not exceed about 2 centimeters.

The normal force applied by the air cylinder assembly 22 is monitored for control and data recording purposes by means of the axial force transducer 26 associated with shaft 18.

After the desired amount of fusion has occurred, solenoid 23, located in the air intake of air motor 21 is activated, causing abrupt blockage of the air entering the supply line to the motor, shown by the associated arrow. With rotation of the shaft 18a, thereby arrested, friction ceases, and the molten material at the weld surface solidifies, completing the welding process.

A notable advantage of the blockage provided by operation of the solenoid at the air motor's air intake when rotation is discontinued results from the fact that the abrupt intake blockage produces a vacuum within the motor, functioning in effect as a vacuum brake, allowing the motor to be stopped substantially instantaneously, in practice within about 0.2 seconds. Thus over-run of the motor, and therefore of shaft 18a is avoided, preventing stress-creating twisting of the weld zone during its process of solidification.

Since weld strength can be correlated with the conditions under which the weld is created, it is desirable to have the capability of monitoring such variables both as a process control, and in order to form empirical conclusions regarding the control of the welding variables that it is desirable to exercise.

Variables that have been found important to weld quality include torque values; the force exerted by one weld surface against the other, i.e., the axial normal force on the weld members; the rotational speed of the rotating weld member; the degree of burn-off of the weld members, and the coefficient of friction between the weld members.

With ordinary friction welding apparatus, measurement of the coefficient of friction, that is, the ratio of the torque to the bearing force normal to the joined weld members, is difficult or impossible to measure due to the frictional drag of the components making up the friction welding apparatus.

Torque will depend upon the nature of the materials being welded, the rotational velocity of the rotating weld member, and the temperature of the weld members. However, typical torque values will range up to 2 newton-meters.

In ordinary friction welding apparatus, the necessity of applying a normal force to the weld components makes the elimination of friction particularly difficult, and prevents the obtainment of accurate torque measurements, as previously described. In the friction welding apparatus of the invention, however, the elimination of friction by means of the single-contact-point, spherical coupling surfaces joining the normal force generator and the non-mounting end of shaft 18, and the frictionless linear bearing suspension of the non-rotating shaft of the apparatus eliminates friction sufficiently to allow welding to be conducted without torque measurement-disabling friction.

Typically, the normal forces required to create sufficient frictional heat will, depending upon the nature of the material to be joined, range from about 20 to about 200 psi; consequently, without the "friction decoupling", single-contact-point coupling features of the invention, dynamic torque measurements during the actual welding process would be impractical.

Following the termination of rotation, the normal force is continued for a brief interval, as a "forging" force to assure formation of a high quality weld. The forging time will vary, depending upon the materials being welding; in the case of polypropylene, for example, the period will last from about 1 to 2 seconds. If desired, the normal force initially applied can be increased during the forging period, a technique sometimes resulting in weld improvement.

Dynamic or kinetic friction is also affected by the velocity of the contacting surfaces, relative to each other, sometimes referred to as the "rubbing" velocity, as well as by the temperature of the contacting surfaces. Advantageously, therefore, the apparatus of the invention will be provided with means for detecting both the temperature of, and relative rotational velocity between the contacting members.

The temperature of the contacting weld members will depend upon both the nature of the materials from which they are made, as well as the rotational speed of the apparatus. The rotational speed is normally controlled at from about 500 to 7000 rpm and may be measured by any of a variety of devices well-known to the art employed for such purpose, for example, a tachogenerator, optoelectronic couplers reflecting off the rotating chuck of the apparatus, or equivalent devices.

Temperatures may be measured by the use of thermocouples in close proximity to the welding surface; by non-contacting infrared radiation thermometers, or by other methods also known to the art.

When the apparatus of the invention is used for gathering dynamic friction coefficient data, it is of advantage to make the measurements while employing hollow circular weld members, since they allow the accurate determination of tangential velocities. This is important due to the fact that frictional coefficients are affected by rubbing velocities, as previously described. Weld members for such purpose can comprise hollow tubing or pipe members, either selected as such, or fabricated from solid rods whose centers have been appropriately drilled out.

The invention will be better understood in the light of the following example which is provided by way of illustration, and not limitation.

EXAMPLE

A solid thermoplastic polypropylene rod 1.27 centimeters in diameter is produced by extrusion, and two pieces of the rod, each approximately 1.6 centimeters are mounted in apparatus of the type described in connection with FIG. 1. The apparatus includes piezoelectric force transducers for measuring torque and for measuring the normal force applied to the sample pieces. An optoelectronic coupler is provided to monitor the speed of revolution of the rotating shaft, and a linear variable differential transducer is included to measure burn-off. The sample pieces, or weld members are mounted in the holding chucks of the apparatus and firmly tightened, care being exercised to assure that the pieces are aligned along the axis of the shafts. The solenoid valve on the air inlet of the air motor is then opened and adjusted to the point at which sufficient air is admitted to the motor to achieve the desired rotational speed of the rotating shaft. Air pressure is then provided to the air cylinder so that the axial force normal to the weld pieces is at a predetermined level. In this case, the apparatus is controlled by a computer, and the desired parameters are established in the data acquisition software that governs the welding process. Welding time, forging time, and data sampling frequency are thus introduced into the computer to control the process.

After the rotating weld member reaches a constant speed, a relay controlling the solenoid valve to the air cylinder is activated, and the two weld members are brought into frictional contact with each other. Contact is maintained until the interfacial friction provides sufficient energy to melt the interface surface of the members. At this point, the relay controlling the air motor solenoid valve is deactivated, causing the latter to stop within about 0.2 seconds. The axial force is maintained for an additional period of 1 to 2 seconds, after which the weldment resulting is removed from the apparatus.

Examination of the weld shows it to be of satisfactory quality, and to possess no unusual stresses.

While in accordance with the patent statutes, a preferred embodiment and best mode has been presented, the scope of the invention is not limited thereto, but rather is measured by the scope of the attached claims.

What is claimed is:

1. A friction welding apparatus comprising:
   a first, substantially non-rotating shaft axially aligned with a second, rotating shaft;
   means for mounting members to be welded together to adjacent, mounting ends of each of said shafts;
   means for applying a measured force axial to said shafts;
   single-contact-point coupling means for coupling said force-applying means to the non-mounting end of said first shaft;
   means for rotating said second shaft; and
   means for measuring torque applied to said first shaft; wherein said first shaft can be axially moved by said force-applying means to bring said members together, and said second shaft can be rotated by said rotating means to cause the generation of frictional heat at the contacting surfaces of said members sufficient to fuse said surfaces together.

2. An apparatus according to claim 1 which also includes means for measuring the amount of burn-off during the welding of said members in said apparatus.

3. An apparatus according to claim 2 in which said burn-off measuring device is a linear variable differential transformer.

4. An apparatus according to claim 1 which includes means for measuring the rotational speed of said second shaft.

5. An apparatus according to claim 1 which includes means for measuring the temperature of said members when in frictional contact with each other.

6. An apparatus according to claim 1 in which the force-applying means is an air cylinder, and the force applied to said first shaft is measured by a force transducer.

7. An apparatus according to claim 1 in which said torque-measuring means comprises a lever arm connected to said first shaft, and in which the free end of said arm rests on a force transducer.

8. An apparatus according to claim 1 in which said torque measuring means comprises a thin film strain gauge adhesively attached to a portion of the circumference of said first shaft between the weld member held thereby and means for preventing rotation of said first shaft.

9. An apparatus according to claim 1 in which said first shaft is supported by linear bearings.

10. An apparatus according to claim 1 in which said rotating means is an air motor whose air intake is provided with a solenoid valve that controls air supply to said motor, and that functions as a vacuum brake when activated to block air to the motor.

11. An apparatus according to claim 1 in which said single-contact-point coupling means comprises a point of contact between said force-applying means and said non-mounting end of said first shaft, and in which said coupling means is defined by the contact between two spherical surfaces.

12. A friction welding apparatus comprising:
    a first substantially non-rotating shaft axially aligned with a second rotating shaft;
    means for mounting members to be welded together to adjacent mounting ends of said shafts;
    means for applying a measured force axial to said shafts;
    single-contact-point coupling means for coupling said force-applying means and the non-mounting end of said first shaft, said coupling means being defined by the point of contact between two adjacent spherical surfaces;

an air motor drive assembly for rotating said second shaft;

means for measuring the amount of burn-off during the welding of said members mounted in said apparatus; and means for measuring torque applied to said first shaft, wherein said first shaft can be axially moved by said force-applying means to force said members into contact with each other, and said second shaft can be rotated by said rotating means to cause the generation of frictional heat at the contacting surfaces of said members sufficient to fuse said surfaces together.

13. An apparatus according to claim 12 wherein the air intake of said air motor is provided with a solenoid valve that controls air supply to said motor, and that functions as a vacuum brake when activated to block air to the motor.

* * * * *